United States Patent
Takahashi

[11] Patent Number: 5,897,190
[45] Date of Patent: Apr. 27, 1999

[54] ILLUMINATION OPTICAL SYSTEM, PROJECTION OPTICAL SYSTEM AND DISPLAY APPARATUS USING THE SAME

[75] Inventor: Ryusaku Takahashi, Yokosuka, Japan

[73] Assignee: Victor Company of Japan, Ltd., Yokohama, Japan

[21] Appl. No.: 08/712,651

[22] Filed: Sep. 13, 1996

[30] Foreign Application Priority Data

Sep. 13, 1995 [JP] Japan ..................................... 7-262085

[51] Int. Cl.$^6$ ................................................. G03B 21/00
[52] U.S. Cl. .............................. 353/31; 353/34; 353/84; 349/8
[58] Field of Search ............................. 353/31, 34, 37, 353/84, 99, 102; 349/7, 8, 97, 106, 108; 359/10, 11, 15, 19, 22, 24, 28, 32, 33, 643

[56] References Cited

U.S. PATENT DOCUMENTS

| | | | |
|---|---|---|---|
| 5,264,880 | 11/1993 | Sprague et al. | 353/31 |
| 5,467,206 | 11/1995 | Loiseaux et al. | 353/34 |
| 5,555,041 | 9/1996 | Manabe | 353/97 |
| 5,623,348 | 4/1997 | Ogino | 353/31 |
| 5,633,737 | 5/1997 | Tanaka et al. | 349/95 |
| 5,719,706 | 2/1998 | Masumoto et al. | 359/634 |
| 5,737,040 | 4/1998 | Ichikawa et al. | 349/9 |
| 5,738,429 | 4/1998 | Tagawa et al. | 353/42 |

FOREIGN PATENT DOCUMENTS

| | | |
|---|---|---|
| 0 458 270 | 11/1991 | European Pat. Off. . |
| 0 492 640 | 1/1992 | European Pat. Off. . |
| 0 490 171 | 6/1992 | European Pat. Off. . |
| 1-68190 | 3/1989 | Japan . |
| 03 198 491 | 8/1991 | Japan . |
| 3288124 | 12/1991 | Japan . |
| 4-22914 | 1/1992 | Japan . |
| 07 181 487 | 7/1995 | Japan . |

*Primary Examiner*—William Dowling
*Attorney, Agent, or Firm*—Michael N. Meller

[57] ABSTRACT

This invention provide an image display apparatus having an illumination optical system for effectively illuminating a plurality of areas on a single common plane uniformly by shortening optical paths of the optical system and a new projection optical system capable of reducing the overall size of the optical system and a production cost thereof. The illumination optical system has an ellipse mirror for collecting light beams generated from a light source, a first lens group for suppressing divergence of the light beams reflected from a light collecting area of the ellipse mirror, a plural color filters for separating the light beams into three color light beams and altering a path of each of the three color light beams, and a second lens group for illuminating objects disposed on the single common plane by focusing the separated three color light beams thereon.

20 Claims, 11 Drawing Sheets

ILLUMINATION OPTICAL SYSTEM, PROJECTION OPTICAL SYSTEM AND DISPLAY APPARATUS USING THE SAME

BACKGROUND OF THE INVENTION

1. Field of the Invention

This invention relates to optical systems for constituting image display apparatuses, particularly, relates to illumination optical systems and projection optical systems suitable for constructing an image display apparatus in which plural images having respective colors are formed on a single and common plane at every.

2. Description of the Related Arts

As an optical system in which plural images are formed on a single and common plane with respective colors, there is disclosed a tri-color separation optical system in Japanese Patent Laid-open Publication, 1-68190/1989, filed by the present Applicant.

This optical system is constructed as a tri-color separation system for an image sensing device as shown in FIG. 1. Description is simply given of a principle thereof.

FIG. 1 is a schematic view showing a tri-color separation optical system in the prior art. Referring to FIG. 1, an object "O" is focused on an image plane "F" by an image sensing lens "PL". A dichroic prism Dp is disposed in an optical path. In the dichroic prism Dp, a reference character BDM denotes a B-dichroic mirror surface for reflecting a blue color and transmitting green and red colors, and RDM an R-dichroic mirror surface for reflecting a red color and transmitting green and blue colors. Reference characters Mr and Mb denote total reflection mirrors, Pr an optical path compensating prism for the red color and Pb an optical path compensating prism for the blue color. The optical path compensating prisms Pr, Pb are respectively used for both a red color optical path and a blue color optical path to cause their optical path lengths from the image sensing lens PL to the image plane F to be equal to that of a green color which passes straight the dichroic prism Dp. Thus, the red, blue and green colors images are respectively focused on the common plane by the functions of the optical compensating prisms Pr, Pb.

A white light beam impinging on the image sensing lens PL from the object 0 further impinges on the dichroic prism Dp.

Among a white light beam impinging on the dichroic prism Dp, a green color component beam passes through the R-dicrhoic and B-dicrhoic mirror surfaces RDM, BDM, and is focused on the image plane F as a displayed image Ig.

Among the white light beam impinging on the dichroic prism Dp, a blue color component beam is reflected by the B-dicrhoic mirror surface BDM, and impinges on the optical compensating prism Pb. Then, the blue color component beam impinging on the B-optical compensating prism Pb is reflected by the total reflection mirror Mb, and is focused on the image plane F as a displayed image Ib.

Among the white light beam impinging on the dichroic prism Dp, a red color component beam is reflected by the R-dicrhoic mirror surface RDM, and impinges on the optical compensating prism Pr. Then, the red color component beam impinging on the R-optical compensating prism Pr is reflected by the total reflection mirror Mr, and is focused on the image plane F as a displayed image Ir.

As a result, the image of the objective O is obtained on the image plane F as three displayed images Ib, Ig, Ir by being separated into three colors, blue, green and red.

In this case, the description is given of the tri-color separation optical system for the image sensing device.

However, this principle is applicable to the tri-color separation optical system for the illumination optical system by substituting the object O with a light source. Thus, the three light source images are obtained on a common image plane with respective colors.

This principle is also applicable to a tri-color composition optical system by reversing these optical paths.

As an exemplary display device employing the optical system shown in FIG. 1, there is a color image display device disclosed in Japanese Patent Laid-open Publication, 3-288124/1991, filed by the present Applicant.

This color image display device is shown in FIG. 2.

FIG. 2 is a perspective view showing a color image display apparatus in the prior art.

The description is simply given of the principle of the color image display apparatus.

Referring to FIG. 2, when a light beam from a light source LAMP impinges on a polarizing beam splitter PBS, a light beam having a component mainly oscillating in a direction perpendicular to a plane of incidence defined by a normal line of a boundary surface and an incident ray is reflected by a boundary surface thereof in a direction of a tri-color separation optical system SCA having the same construction as one shown in FIG. 1. The light beam is separated into the three color RGB light beams in the tri-color separation optical system SCA in the same manner as mentioned in the foregoing, and each of them impinges on a reflection type spatial light modulation element SLMr. The three color RGB light beams are reflected by the reflection type spatial light modulation element (referred to as display element) SLMr, and back-track the optical path to the tri-color separation optical system SCA, and impinge on the polarizing beam splitter PBS. The polarizing beam splitter PBS causes the light beam having a component oscillating in a direction parallel to the plane of incidence to pass through the boundary surface thereof. Thus, these light beams are projected by a projection lens PL by being magnified.

However, when the prisms shown in FIG. 1 are applied to the tri-color separation optical system SCA shown in FIG. 2, effective light beams among the light beams incident on the optical system from the light source correspond to ones impinging on areas EA of the display element SLMr. In other words, effective apertures of the display element SLMr becomes smaller than those of the optical system. Thus, the availability factor of the, display element SLMr is decreased, resulting in a cost problem of the display element.

When three individual pieces of the display elements SLMr are disposed on a single plane, it requires the prisms having larger apertures than effective areas of the display element. This poses problems of a large size of the optical system and of a decrease of the availability factor of the light because of a long optical path.

In the color composition optical system, the same problem occurs. In order to effectively utilize the light beam reflected by the display element, it requires an objective lens having a larger aperture. Thus, the prism needs an aperture as large as that of the objective lens.

Further, when the tri-color separation optical system shown in FIG. 2 is constructed by using the prisms made of optical glass, a birefringence occurs due to the optical glass. This poses a problem of a decrease of a contrast ratio.

These problems occur not only in the case of the reflection type display element but also in the case of the transmission type display element.

SUMMARY OF THE INVENTION

Accordingly, a general object of the present invention is to provide an illumination optical system, an projection optical system and an image display apparatus using the same in which the above disadvantages have been eliminated.

A specific object of the present invention is to provide an illumination optical system comprising: an ellipse mirror having a light collecting area for collecting light beams generated from a light source; a first lens group having a converging characteristic for suppressing a divergence of the light beams reflected from the light collecting area of the ellipse mirror; color filtering means for separating the light beams into three color light beams and altering paths of the three color light beams being separated, and a second lens group having a converging characteristic for illuminating objects disposed on a single common plane by focusing the separated three color light beams thereon.

A more specific object of the present invention is to provide an illumination optical system comprising: a parabolic mirror for reflecting and changing light beams generated from a light source into parallel beams approximately; color filtering means for separating the light beams from the parabolic mirror into three color light beams and altering optical paths of the three color light beams being separated, and a lens group having a conversing characteristic for illuminating objects disposed on a single common plane by focusing the separated three color light beams thereon.

Another and specific object of the present invention is to provide a projection optical system comprising: a color composition means for forming a single image light beam for projection from a plurality of color images disposed on an approximately single and common plane at a predetermined distance therebetween, a projection lens for projecting the image light beam, and a plurality of convex lenses disposed between the plurality of color images and the color composition means for inputting the plurality of color images disposed on the approximately single and common plane to the color composition means so that the predetermined distance is made smaller when the plurality of color images are inputted to the color composition means to form the single image light beam.

Another and specific object of the present invention is to provide a projection optical system comprising: a projection lens group having a diaphragm, for projecting an image light beam composed of a plurality of color light beams and, a color composition means for forming the image light beam composed of the plurality of color light beams generated from a plurality of color images disposed on an approximately single and common plane at a predetermined distance, wherein the color composition means is provided nearby the diaphragm of the projection lens in such a manner that different principal lays of the plurality of color light beams accord with an identical principal lay so as to form the image light beam.

Other objects and further features of the present invention will be apparent from the following detailed description.

DETAILED DESCRIPTION OF THE PREFERRED EMBODIMENTS

[First embodiment]

Figure 1:
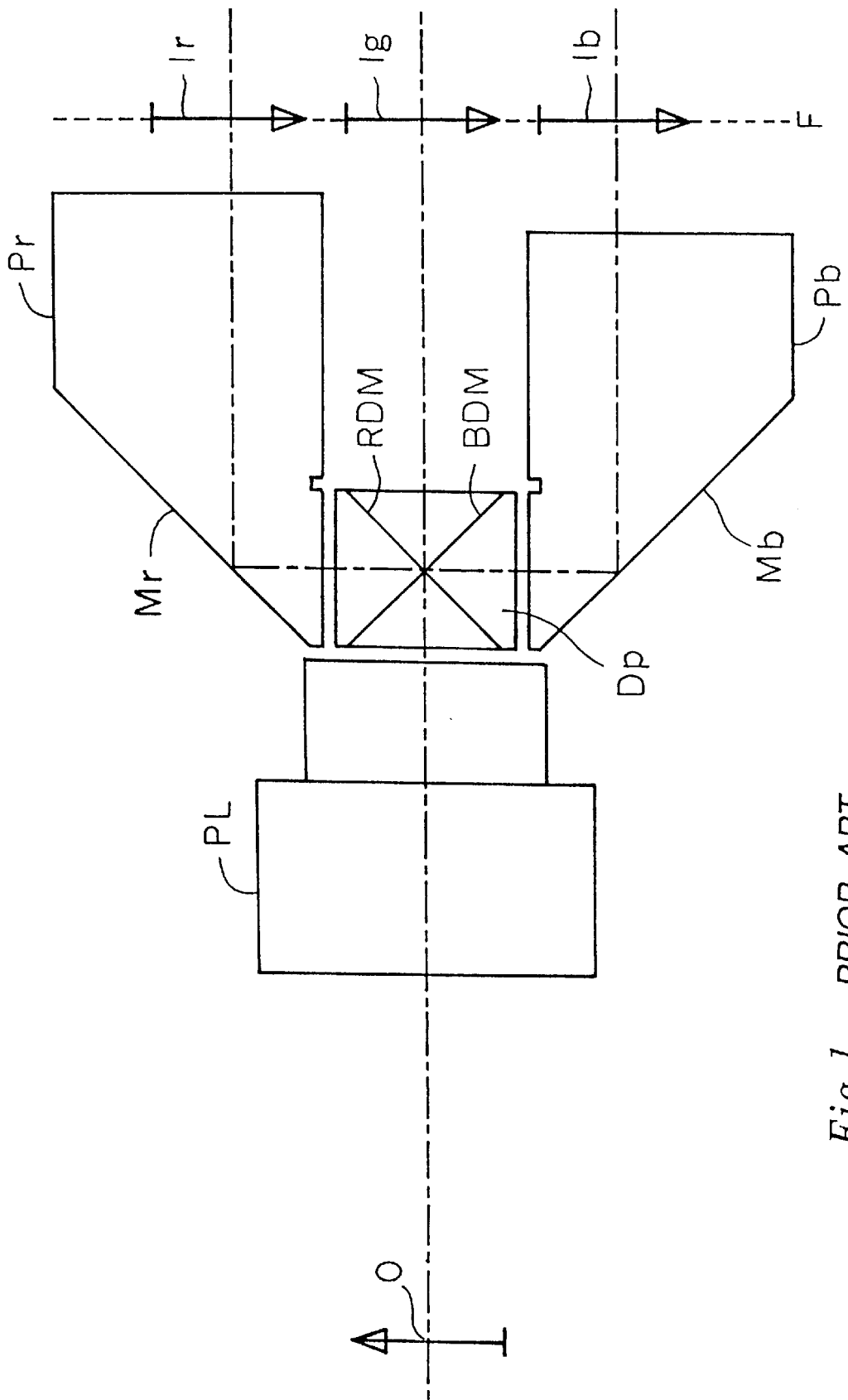
FIG. 1 is a schematic view showing a tri-color separation optical system in the prior art.
Figure 2:
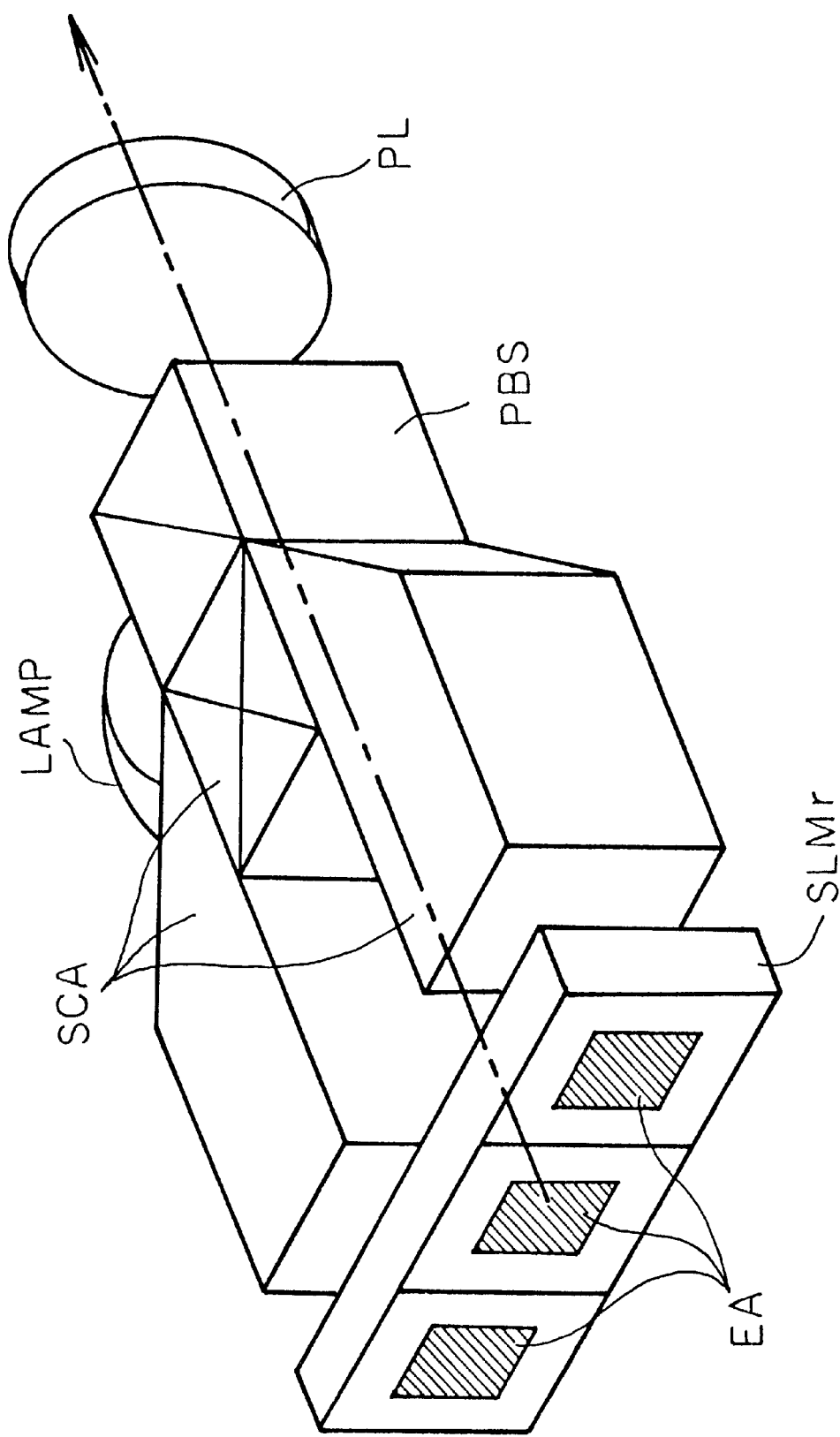
FIG. 2 is a perspective view showing a color image display apparatus in the prior art.
Figure 3:
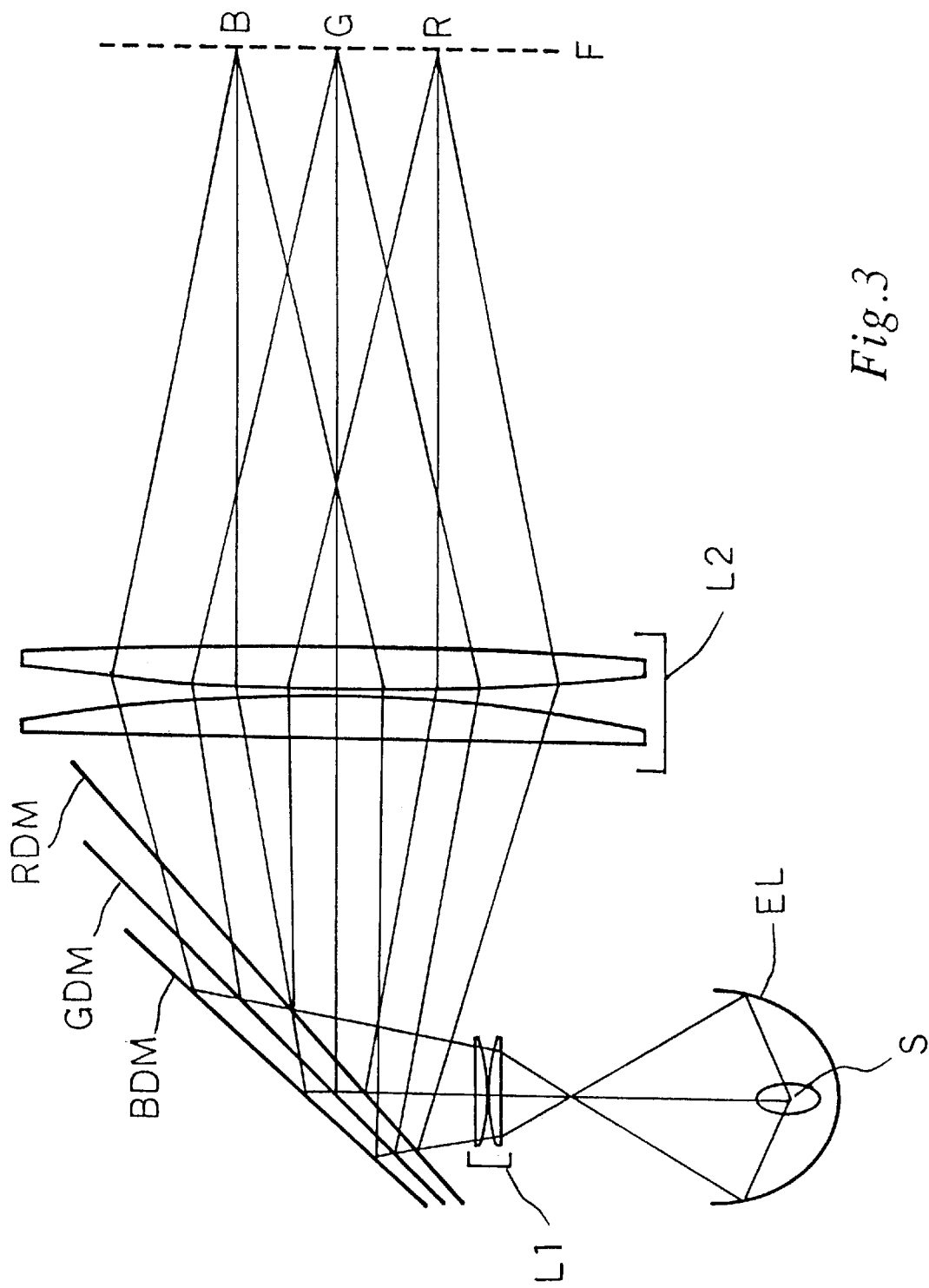
FIG. 3 is a schematic view showing an illumination optical system of a first embodiment of the present invention, wherein three color images of a light source are focused on an image plane.

Description is given of an illumination optical system of a first embodiment of the present invention in detail in reference to FIG. 3.

FIG. 3 is a schematic view showing an illumination optical system of a first embodiment of the present invention, wherein three color images of a light source are focused on an image plane.

In FIG. 3, light beams generated from a light source S are collected by an elliptical mirror EL. A first lens group L1 is disposed so that a spot of light beams collected by the elliptical mirror EL is positioned within a focal length (not shown) of the first lens group L1. Thereby, the first lens group L1 has a function of a bright lens group by suppressing the diffusion of the light beams.

The light beams outputted from the first lens group L1 impinge on a plurality of dichroic mirrors of which reflection angles are different from each other. The plurality of dichroic mirrors include a first dichroic mirror RDM having a characteristic of reflecting a red color light beam and transmitting green and blue color light beams, a second dichroic mirror GDM having a characteristic of reflecting the green color light beam and transmitting the red and blue color light beams and a third dichroic mirror BDM having a characteristic of reflecting the blue color light beam and transmitting red and green color light beams.

First, when the light beams outputted from the first lens group L1 impinge on the first dichroic mirror RDM, the red color light beam is reflected thereby. When the green and blue color light beams passing through the first dichroic mirror RDM impinge on the second dichroic mirror GDM, the green color light beam is reflected thereby. When the blue color light beam passing through the second dichroic mirror GDM impinges on the third dichroic mirror BDM, the blue color light beam is reflected thereby.

Relation among the reflection angles of R, G, B color light beams is represented by a formula (1).

Reflection angle of B color light>reflection angle of G color light>reflection angle of R color light (1)

Each of the RGB color light beams reflected by the dichroic mirrors RDM, GDM, BDM impinges on a second lens group L2 so that optical axes of respective color light beams becomes is parallel to each other, and they are focused on a single plane (image plane F) common to all the RGB color images by controlling the focal length of the second lens group L2. Thus, the RGB color light beams are aligned in line on the image plane F at separate positions B, G, R, respectively.

According to the illumination optical system of the first embodiment in the present invention, it is possible to obtain easily illuminations of three colors having a uniform illuminance distribution on a single plane.

Such an optical system as focusing three color images of a light source on the image plane F has a high availability factor of the light. This enables to display an image having a high luminance.

Figure 11:
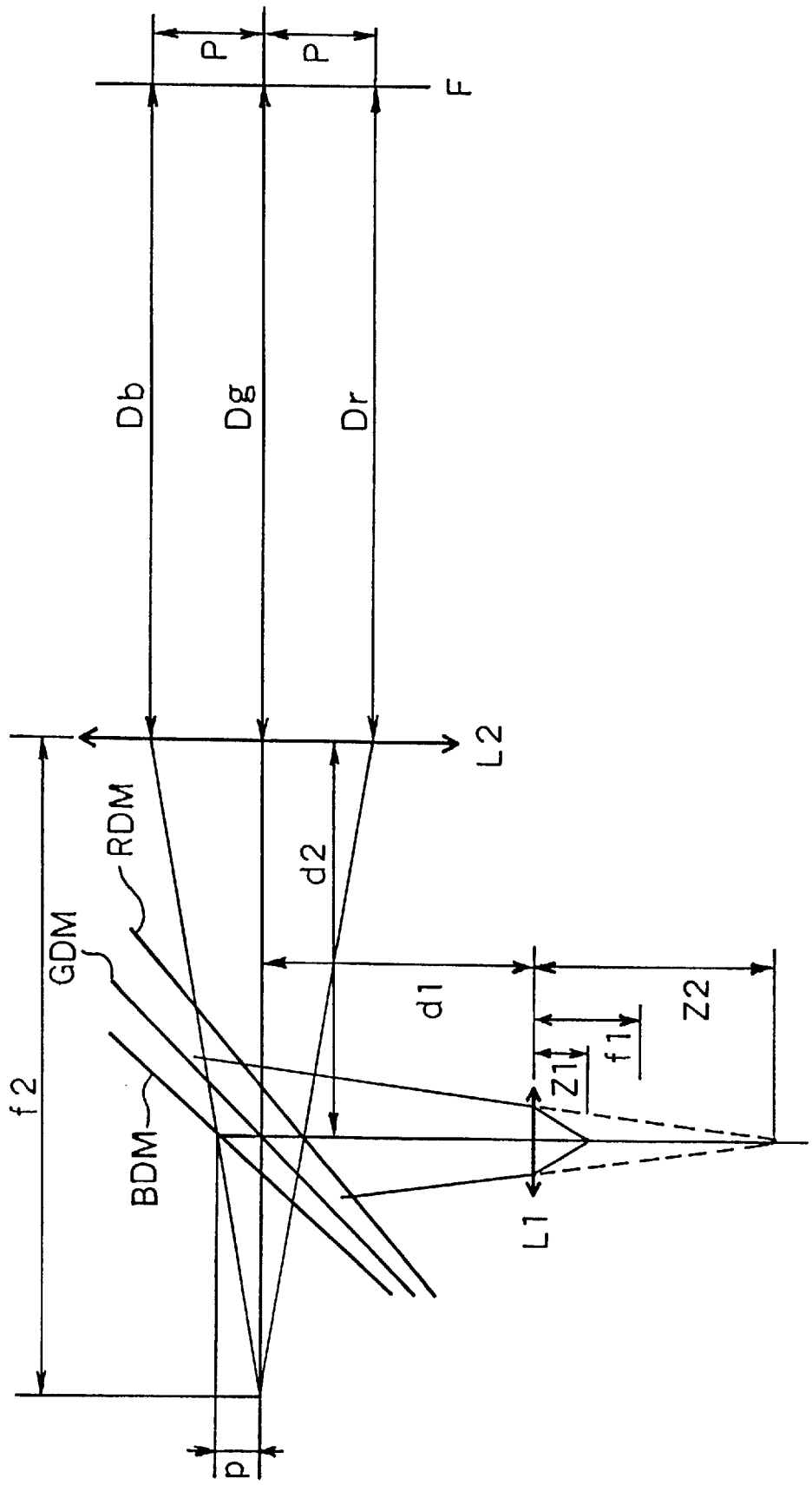
FIG. 11 is a diagrammatic representation of the system shown in FIG. 3, wherein the like parts are denoted with the like reference characters. Further, the first and second lens groups L1, L2 are represented by thin lenses for simplicity.

Further, the description is given of paraxial relations in the illumination optical system shown in FIG. 3 of the first embodiment in the present invention in reference to FIG. 11.

FIG. 11 is a diagrammatic representation of the system shown in FIG. 3, wherein the like parts are denoted with the like reference character. Further; the first and second lens groups L1, L2 are represented to be thin lenses for simplicity.

In FIG. 11, a focal length of the first lens group L1 is denoted by a reference character f1, and a converged light spot produced by the light source S with the elliptical mirror EL resides at a position apart from the first lens group L1 by a distance of Z1. A relation between the focal length f1 and the distance Z1 is represented by a formula (2).

$$f1 > Z1 \tag{2}$$

When the light beam refracted by the first lens group L1, is assumed to be generated from an imaginary light source located at a distance of Z2, the following formula (3) is introduced by using the relations of Newton's image formation.

$$Z2 = \{f1^2/\{f1-Z1\}\} - f1 \tag{3}$$

When "d1"is a distance from the first lens group L1 to an intersecting point where an optical axis of the first lens group L1 intersects the second dichroic mirror GDM, and "d2"is a distance from the intersecting point to the second lens group L2, a total distance from the imaginary light source to the second lens group L2 becomes Z2+d1+d2.

Here, by letting a distance from the second lens group L2 to the image plane F be Dg and a focal length of the second lens group L2 be f2, a formula (4) is obtained.

$$Dg = \{f2(Z2+d1+d2)\}/\{Z2+d1+d2-f2\} \tag{4}$$

Further, when a pitch of displayed images on the image plane F is made to be P, a vertical distance p between the second and third dichroic mirrors GDM, BDM along the optical axis is represented by a formula (5).

$$p = (f2-d2)P/f2 \tag{5}$$

A vertical distance between the first and second dichroic mirrors RDM, GDM is also equal to the distance p.

When reflection angles of the third and first dichroic mirrors BDM, RDM is made to be $\Theta b$, $\Theta r$, respectively, the reflection angles $\Theta b$, $\Theta r$ are represented by a formula (6) when the reflection angle of the second dichroic mirror GDM is 45°.

$$\Theta b = \{\{\arctan\{(P-p)/d2\}\}+90°\}/2 \quad \Theta r = \{\{\arctan\{(p-P)/d2\}\}+90°\}/2 \tag{6}$$

Further, displacement values of focused positions of the images of the light source with respect to various kinds of colors are obtained as follows.

A distance d1(blue) from the first lens group L1 to the third dichroic mirror BDM is represented by a formula (7).

$$d1(\text{blue}) = d1 + p \tag{7}$$

A distance d2(blue) of the blue light on the optical axis from the third dichroic mirror BDM to the second lens group L2 is represented by a formula (8).

$$d2(\text{blue}) = d2/\cos\{\arctan\{(P-p)/d2\}\} \tag{8}$$

Thus, a distance Db of the blue light from the second lens group L2 to the image plane F is represented by a formula (9) from the formula (4).

$$Db = f2\{Z2+d1+p+\{d2/\cos\{\arctan\{(P-p)/d2\}\}\}\} \div \{Z2+d1+p+\{d2/\cos\{\arctan\{(P-p)/d2\}\}\}-f2\} \tag{9}$$

Next, a distance d1(red) from the first lens group L1 to the first dichroic mirror RDM is represented by a formula (10).

$$d1(r) = d1 - p \tag{10}$$

A distance d2(red) of the red light on the optical axis from the first dichroic mirror RDM to the second lens group L2 is represented by a formula (11).

$$d2(\text{red}) = d2/\cos\{\arctan\{(P-p)/d2\}\} \tag{11}$$

Thus, a distance Dr of the red light from the second lens group L2 to the image plane F is represented by a formula (12) by using the formula (4).

$$Dr = f2\{Z2+d1-p+\{d2/\cos\{\arctan\{(P-p)/d2\}\}\}\} \div \{Z2+d1-p+\{d2/\cos\{\arctan\{(P-p)/d2\}\}\}-f2\} \tag{12}$$

An representative example of the first embodiment is as follows:

Letting f1=50 mm, f2=100 mm, d1=30 mm, d2=60 mm, Z1=40 mm, and P=10 mm, there are obtained p=4 mm, $\Theta b$=47.9°, $\Theta r$=42.1°, Z2=200 mm, Dg=152.6 mm, Db=151.5 mm and Dr=153.7 mm.

Accordingly, with respect to the position of the second dichroic mirror GDM, each of the first and third dichroic mirror is placed at a vertical distance of 4 mm from the position of the second dichroic mirror GDM. Further, referred to the reflection angle 45° of the second dichroic mirror GDM, the reflection angle of the first dichroic mirror RDM is further declined by +2.9° from the surface of the second dichroic mirror GDM and the reflection angle of the third dichroic mirror GDM is declined by −2.9°.

Further, referred to the focused image formed by the G color light beam on the image plane F, focused images by the R, B color light beams, respectively, are accurately formed on the image plane F within a range of ±1 mm. In particular, these three focused images are considered to be displayed on a single common plane because the light source itself has a certain magnitude. Thus, it is possible to obtain three light source images having the uniform illuminance distribution.

[Second embodiment]

Figure 4:
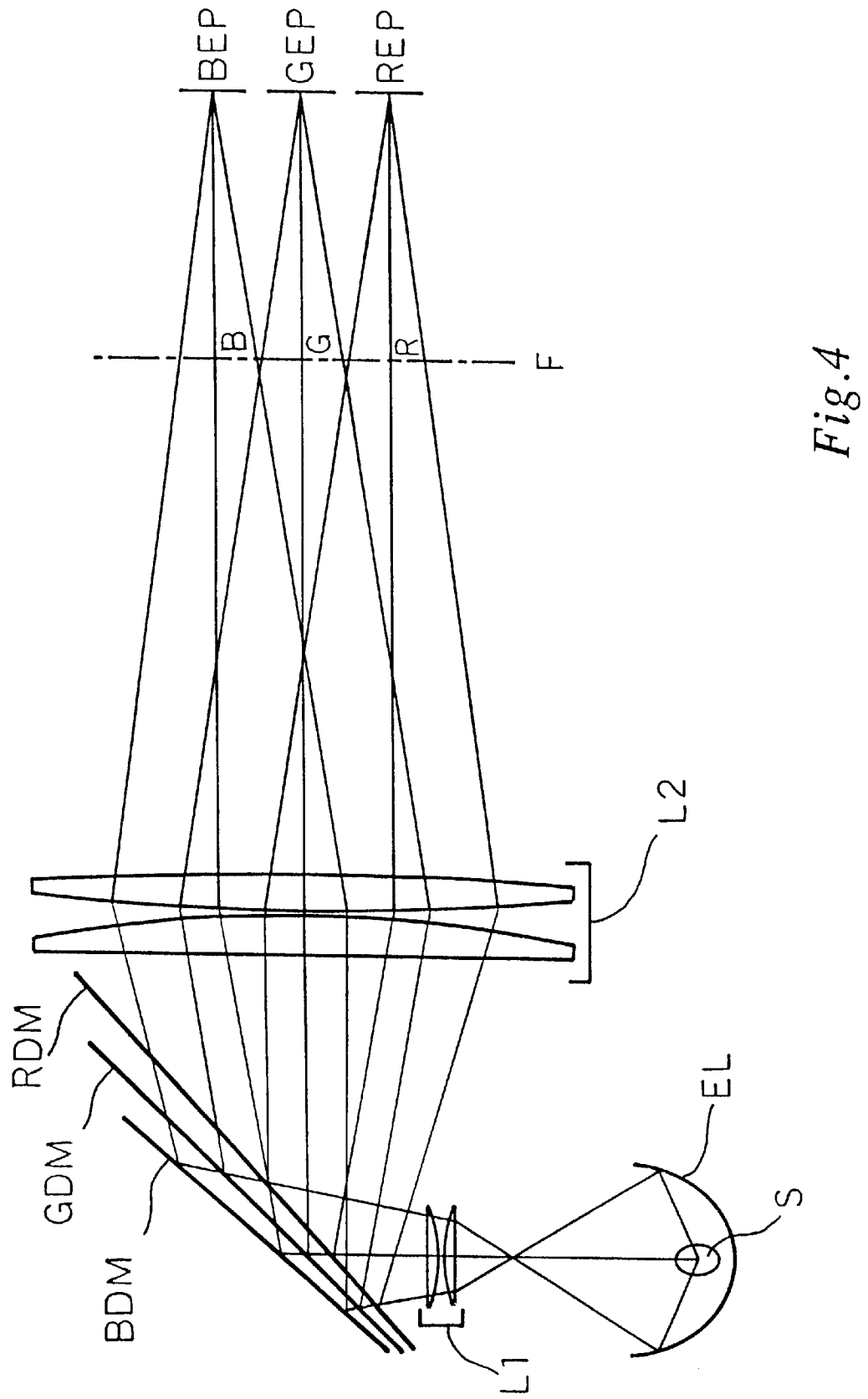
FIG. 4 is a schematic view showing an illumination optical system of the second embodiment in the present invention.

A description is given of an illumination optical system of a second embodiment in the present invention in reference to FIG. 4.

FIG. 4 is a schematic view showing an illumination optical system of the second embodiment in the present invention.

The basic principle of this embodiment is the same as that of the illumination optical system of the first embodiment shown in FIG. 3 except for a light collecting point of the second lens group L2.

In FIG. 4, light beams generated from a light source S are collected by an elliptical mirror EL. A first lens group L1 is disposed so that a spot of light collected by the elliptical mirror EL is positioned within a focal length (not shown) of the first lens group L1. Thereby, the first lens group L1 has a function of a bright lens group by suppressing the diffusion of the light beams.

The light beams outputted from the first lens group L1 impinge on a plurality of dichroic mirrors of which reflection angles are different from each other. The plurality of dichroic mirrors include a first dichroic mirror RDM having a characteristic of reflecting the red color light beam and transmitting the green and blue color light beams, a second dichroic mirror GDM having a characteristic of reflecting the green color light beam and transmitting the red and blue color light beams and a third dichroic mirror BDM having a characteristic of reflecting the blue color light beam and transmitting the red and green color light beams.

First, when the light beams outputted from the first lens group LI impinge on the first dichroic mirror RDM, a red color light beam is reflected thereby. When the green and blue color light beams passing through the first dichroic mirror RDM impinge on the second dichroic mirror GDM, the green color light beam is reflected thereby. When the blue color light beam passing through the second dichroic mirror GDM impinges on the third dichroic mirror BDM, the blue color light beam is reflected thereby.

Relation among the reflection angles of R, G, B color light beams is represented by the formula (1).

RGB color light beams reflected by the dichroic mirrors RDM, GDM, BDM impinge on a second lens group L2, so that they become parallel to each other with respect to optical axes thereof, and are respectively focused on entrance pupils BEP, GEP, REP of projection lenses (not shown) by controlling the focal length of the second lens group L2.

Specifically, the G color light beam is focused on the entrance pupil GEP of a projection lens for projecting the G color light beam, the B color light beam is focused on the entrance pupil BEP of a projection lens for projecting the B color light beam, and the R color light beam is focused on the entrance pupil REP of a projection lens for projecting the R color light beam.

According to the illumination optical system of the second embodiment in the present invention, it is possible to obtain easily the illumination of three colors having the same illuminance distribution on the single common plane as shown in FIG. 4.

Further, the availability factor of the light thereof may be less compared with that of the first embodiment mentioned in the foregoing, however, it is possible to obtain a high quality image without luminance shading irrespective of a lack of uniformity of the light source.

[Third embodiment]

Figure 5:
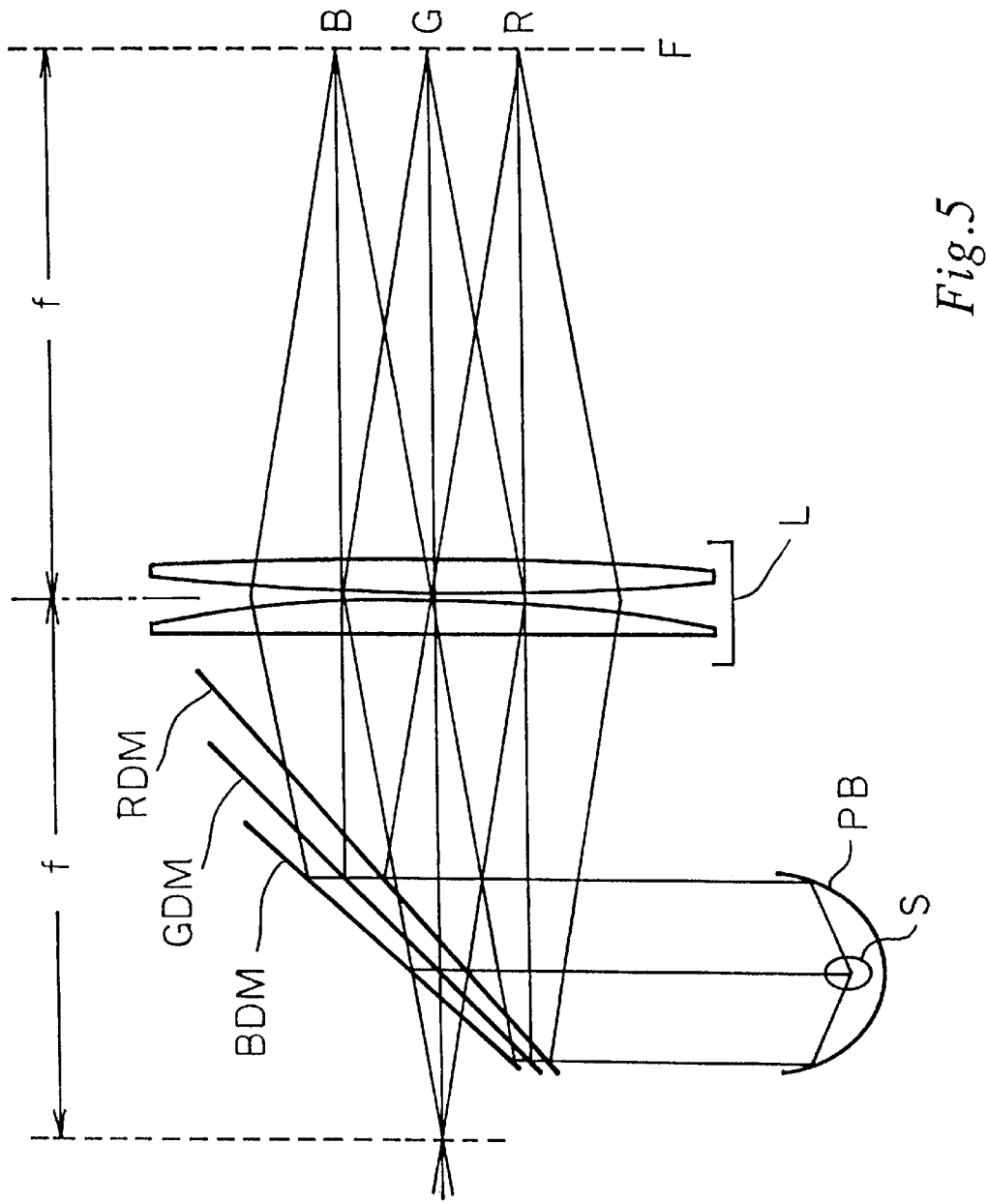
FIG. 5 is a schematic view showing an illumination optical system of the third embodiment in the present invention.

A description is given of an illumination optical system of a third embodiment in the present invention in reference to FIG. 5.

FIG. 5 is a schematic view showing an illumination optical system of the third embodiment in the present invention.

The basic principle of this embodiment is the same as that of the illumination optical system of the first embodiment shown in FIG. 3 except for substituting the elliptical mirror EL with a parabolic mirror PB and removing the first lens group L1.

In FIG. 5, light beams generated from a light source S are made parallel to an optical axis by the parabolic mirror PB.

The light beams outputted from the parabolic mirror PB impinge on a plurality of dichroic mirrors of which reflection angles are different from each other. The plurality of dichroic mirrors include a first dichroic mirror RDM having a characteristic of reflecting a red color light beam and transmitting the green and blue color light beams, a second dichroic mirror GDM having a characteristic of reflecting the green color light beam and transmitting the red and blue color light beams and a third dichroic mirror BDM having a characteristic of reflecting the blue color light. beam and transmitting the red and green color light beams.

First, when the light beams outputted from the parabolic mirror PB impinge on the first dichroic mirror RDM, a red color light beam is reflected thereby. When the green and blue color light beams passing through the first dichroic mirror RDM impinge on the second dichroic mirror GDM, the green color light beam is reflected thereby. When the blue color light beam passing through the second dichroic mirror GDM impinges on the third dichroic mirror BDM, the blue color light beam is reflected thereby.

Relation among the reflection angles of R, G, B color light beams is represented by the formula (1).

RGB color light beams reflected by the dichroic mirrors RDM, GDM, BDM impinge on a lens group L, so that they become parallel to each other with respect the optical axes thereof, and are focused on a single common plane by controlling the focal length of the lens group L. Thus, the RGB color light beams are aligned in line on the single common image plane F at separated positions B, G, R, respectively.

In the illumination optical system of this embodiment, the parabolic mirror PB is employed. Thus, a distance from the lens group L to the image plane F is equal to a focal length f of the lens group L as shown in FIG. 5.

According to the illumination optical system of the third embodiment in the present invention, it is possible to obtain easily the illuminations of three colors having the uniform illuminance distribution on the identical plane.

Further, it is possible to simplify the structure of the optical system compared with those of the first and second embodiments. This contributes to reduce the production cost thereof.

Such optical system as focusing light source images on the image plane F has a high availability factor of the light as well as that of the first embodiment. This enables to display an image having a high luminance as well as the first embodiment In the illumination optical system of the third embodiment, the three color images of the light source are focused on the image plane, however, it is possible to focus them on the entrance pupils of the projection lenses. In that case, it is possible to obtain a high quality image without luminance shading through the availability factor of the light is somehow degraded.

[Fourth embodiment of the illumination optical system]

Figure 6:
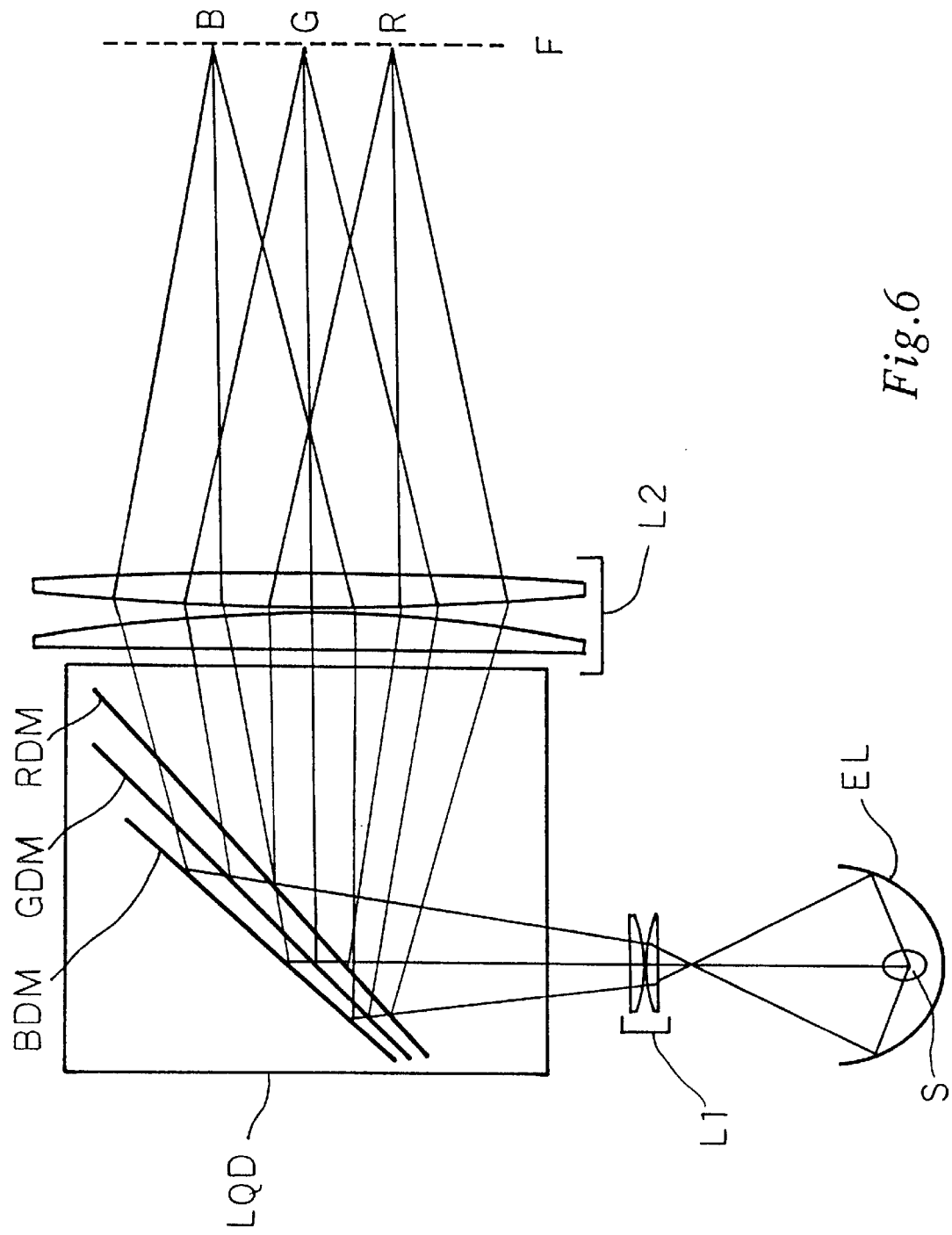
FIG. 6 is a schematic view showing an illumination optical system of a fourth embodiment in the present invention, wherein three color images of a light source are focused on an image plane.

FIG. 6 is a schematic view showing an illumination optical system of a fourth embodiment in the present invention, wherein three color images of a light source are focused on an image plane.

In FIG. 6, light beams generated from a light source S are collected by an elliptical mirror EL. A first lens group L1 is disposed so that a spot of lights converged by the elliptical mirror EL is positioned within a focal length (not shown) the first lens group L1. Thereby, the first lens group L1 has a function of a bright lens group by suppressing the diffusion of the light beams.

The light beams outputted from the first lens group L1 impinge on a plurality of dichroic mirrors enclosed in a transparent liquid LQD having approximately the same refractive index as that of the optical glass in such manner that reflection angles of the plurality of the dichroic mirrors are different from each other.

The plurality of the dichroic mirrors include a first dichroic mirror RDM having a character of reflecting the red color light beam and transmitting the green and blue color light beams, a second dichroic mirror GDM having a characteristic of reflecting the green color light beam and transmitting the red and blue color light beams and a third dichroic mirror BDM for reflecting the blue color light beam and transmitting the red and green color light beams.

First, when the light beams outputted therefrom impinge on the first dichroic mirror RDM, the red color light beam is reflected thereby. When the green and blue color light beams passing through the first dichroic mirror RDM impinge on the second dichroic mirror GDM, the green color light beam is reflected thereby. When the blue color light beam passing through the second dichroic mirror GDM impinges on the third dichroic mirror BDM, the blue color light beam is reflected thereby.

Relation among the reflection angles of R, G, B color light beams is represented by the formula (1).

RGB color light beams reflected by the dichroic mirrors RDM, GDM, BDM impinge on a second lens group L2, so that they become parallel to each other with respect to optical axes thereof, and are focused on a single common plane (image plane F) by controlling the focal length of the second lens group L2. Thus, the RGB color light beams are aligned in line on the image plane F at separate positions B, G, R, respectively.

As the transparent liquid having approximately the same refractive index as that of the optical glass mentioned in the foregoing, there is used, for instance, ethylene glycol (refractive index: 1.43), glycerol (refractive index: 1.473), cedar oil (refractive index: 1.516) paraffin oil (refractive index: 1.480) or benzene (refractive index: 1.501).

When the dichroic mirrors present in such a liquid as the transparent liquid having approximately the same refractive index as that of the optical glass, the light beam has a characteristic to be separated easily by a dichroic mirror into two light beams, one oscillating in a direction parallel to the surface of the drawing and the other oscillating in a direction vertical to the surface of the drawing in FIG. 6.

Especially, the light beam oscillating in the direction parallel to the surface of the drawing in FIG. 6 has a characteristic to easily pass through the dichroic mirrors and the light beam oscillating in the direction vertical to the surface of the drawing has a characteristic to be easily reflected by the dichroic mirrors.

Thus, when the illumination optical system shown in FIG. 6 is fabricated by using the dichroic mirror membrane emphasizing this polarization characteristic, it is suitable for one employing a display element (not shown) made of a photo-modulation member which has a rotary polarization or a birefringence, on the image plane. This contributes to increase the contrast ratio of the image.

According to the illumination optical system of the fourth embodiment in the present invention, it is possible to obtain easily the illuminations of three colors having the uniform illuminance distribution on the single common plane. Such optical system as focusing light source images on the image plane F has a high availability factor of the light. This enables to display an image having a high luminance.

[Fifth embodiment]

Next, the description is given of a fifth embodiment of the present invention as an image display apparatus employing the illumination optical system of the fourth embodiment shown in FIG. 6. The fifth embodiment is a first projection system for projecting an image by composing three color images on a single common plane.

Figure 7:
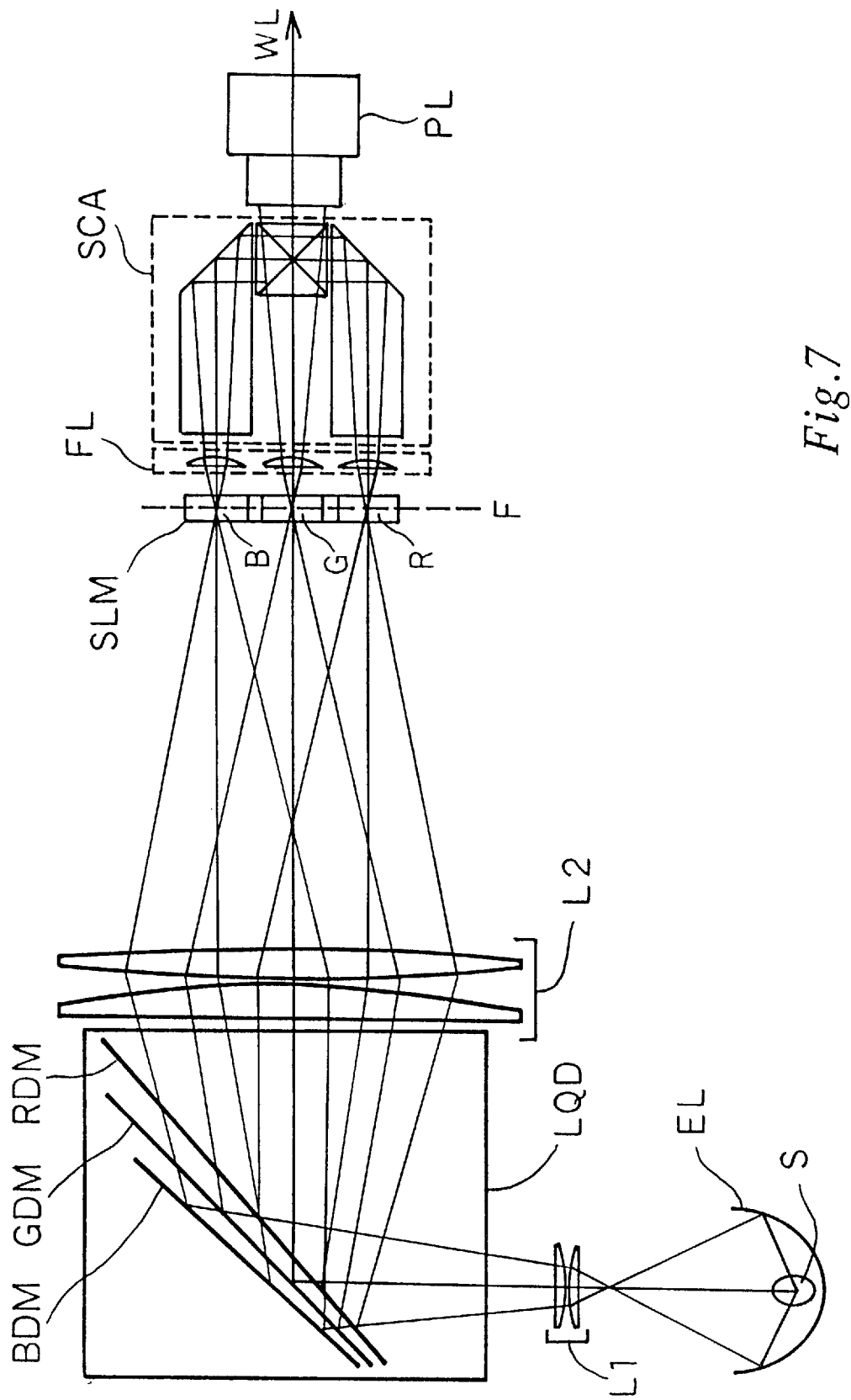
FIG. 7 is a schematic view showing a fifth embodiment of the present invention as an image display apparatus employing the illumination optical system of the fourth embodiment shown in FIG. 6, and a first projection optical system of the present invention.

FIG. 7 is a schematic view showing a fifth embodiment of the present invention as an image display apparatus employing the illumination optical system of the fourth embodiment shown in FIG. 6, and a first projection optical system of the present invention.

In FIG. 7, light beams generated from a light source S are collected by an elliptical mirror EL. A first lens group L1 is disposed so that a spot of lights converged by the elliptical mirror EL is positioned within a focal length (not shown) of the first lens group. Thereby, the first lens group L1 has a function of a bright lens group by suppressing the diffusion of the light beams.

The light beams outputted from the first lens group L1 impinge on a plurality of dichroic mirrors enclosed in a transparent liquid LQD having approximately the same refractive index as that of the optical glass in such manner that reflection angles of the plurality of the dichroic mirrors are different from each other.

Each of the plurality of the dichroic mirrors RDM, GDM, BDM, has such a characteristic as transmitting a light beam (P-polarized light beam) oscillating in a direction parallel to the surface of the drawing in FIG. 7 and reflecting a light beam (S-polarized light beam) oscillating in a direction vertical to the surface of the drawing in FIG. 7.

The plurality of the dichroic mirrors include a first dichroic mirror RDM for reflecting an S-polarized light beam of the red color and transmitting green and blue color light beams, a second dichroic mirror GDM for reflecting an S-polarized light beam of the green color and transmitting the red and blue color light beams and a third dichroic mirror BDM for reflecting an S-polarized light beam of the blue color and transmitting red and green color light beams.

First, when the light beams outputted the elliptical mirror EL impinge on the first dichroic mirror RDM, the S-polarized light beam of the red color is reflected thereby. When the green and blue color light beams passing through the first dichroic mirror RDM impinge on the second dichroic mirror GDM, the S-polarized light beam of the green color is reflected thereby. When the S-polarized light beam of the blue color passing through the second dichroic mirror GDM impinges on the third dichroic mirror BDM, the S-polarized light beam of the blue color is reflected thereby.

Relation among the reflection angles of R, G, B color light beams is represented by the formula (1).

S-polarized light beams reflected by the dichroic mirrors RDM, GDM, BDM impinge on a second lens group L2, so that optical axes of them become parallel to each other, and are focused on a single common plane F (image plane), by controlling the focal length of the second lens group L2.

At the image plane F, there is disposed a transmission type display element SLM equipped with a modulation member having a characteristic of polarization or a characteristic of birefringence. The modulation member of the display element SLM has color displaying areas B, G, R which provide picture information corresponding to B, G, R colors. Thus, the color light beams are respectively converged to the color display areas B, G, R corresponding to the colors, and are outputted therefrom being modulated by the modulation member.

After causing the outputted color light beams to pass through analyzers (not shown) to remove unnecessary components thereof, the outputted color light beams each carrying picture information are inputted to a first projection optical system of the present invention.

This first projection optical system employs the three color composition optical system SCA of the prior art shown in FIG. 11, for forming an image light beam composed of the color light beams generated from RGB color images displayed on the single common plane. Further, the first projection optical system employs convex lenses FL disposed between the display element SLM and the color composition optical system SCA so as to improve an availability of the color display areas B, G, R of the display element.

The color light beams containing picture information outputted from the display element SLM are inputted to the convex lenses FL through analyzers (not shown). They are suppressed to prevent the divergence thereof by the convex lenses FL, and impinge on the three color composition optical system SCA.

An image light beam WL formed by the three color composition optical system SCA is projected on a screen (not shown) being magnified by a projection lens PL.

According to the first projection optical system shown in the fifth embodiment, the divergence of the color light beams are suppressed of every color. Thus, it is possible to make openings of the three color composition optical system SCA positioned at the side of the convex lenses smaller compared with the case where the convex lenses FL are not provided.

This enables to increase the available area of the display element SLM to the overall area thereof, resulting in reductions of the overall size of the optical system and the production cost thereof.

Further, in the image display apparatus shown in the fifth embodiment of the present invention, the three color separation optical system and the three color composition optical system are individually constructed, so that it is possible to project an image having a high contrast ratio irrespective of the material of the three color composition optical system.

Furthermore, it is possible to obtain an image having a higher contrast ratio by providing an analyzer (not shown) between the second lens group L2 and the display element SLM because of a multiplicative effect of the analyzer and the restriction of polarized light components which the dichroic mirrors of the illumination optical system produce.

In this image display apparatus, the illumination optical system shown in FIG. 6 is employed, however, it is possible to employ the ones shown in FIGS. 3 to 5 because they are suitable for illuminating each of the color display areas placed on the single common plane irrespective of the material of the modulation member used in the display element.

[Sixth embodiment]

Figure 8:
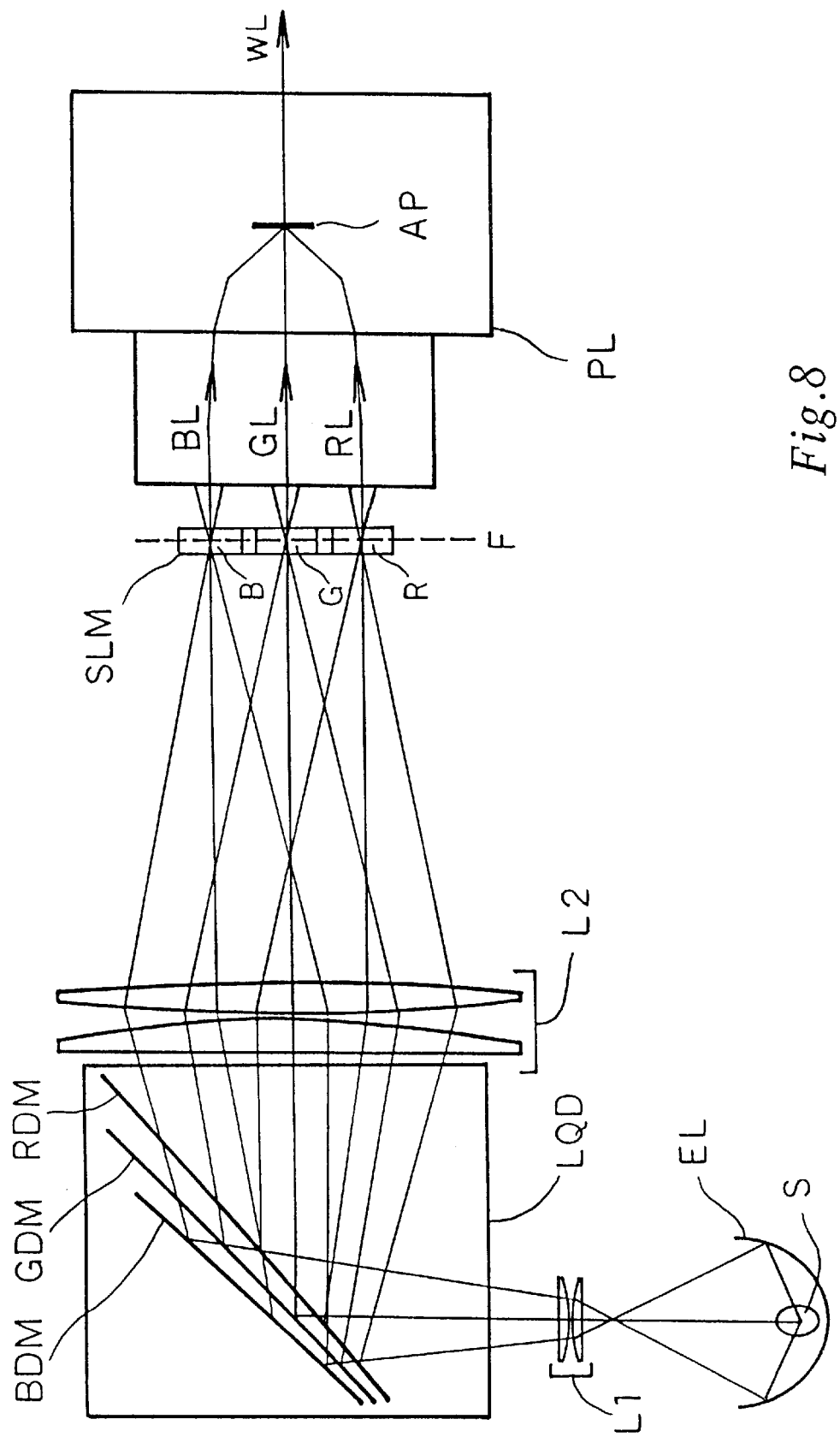
FIG. 8 is a schematic view showing a sixth embodiment of the present invention as an image display apparatus employing a second projection optical system including a hologram and the illumination optical system of the fourth embodiment of the present invention shown in FIG. 6.

Next, referring to FIG. 8, the description is given of an image display apparatus as a sixth embodiment of the present invention.

FIG. 8 is a schematic view showing a sixth embodiment of the present invention as an image display apparatus employing a second projection optical system including a hologram and the illumination optical system of the fourth embodiment of the present invention shown in FIG. 6.

As can be seen from FIG. 8, in this embodiment the illumination optical system (left half) of the fourth embodiment shown in FIG. 6 is employed. Further, there is employed a second projection optical system, wherein the 3-color light images formed on a single common plane are converged on a hologram provided at a diaphragm of a projection lens PL to form a single image light beam WL for projection.

In FIG. 8, light beams generated from a light source S are collected by an elliptical mirror EL. A first lens group L1 is disposed so that a spot of lights converged by the elliptical mirror EL is positioned within a focal length (not shown) of the first lens group. Thereby, the first lens group L1 has a function of a bright lens group by suppressing the diffusion of the light beams.

The light beams outputted from the first lens group L1 impinge on a plurality of dichroic mirrors RDM, GDM, BDM enclosed in a transparent liquid LQD having approximately the same refractive index as that of the optical glass in such a manner that reflection angles of the plurality of the dichroic mirrors are different from each other.

Each of the plurality of the dichroic mirrors RDM, GDM, BDM has such a characteristic as transmitting a light beam (P-polarized light beam) oscillating in a direction parallel to the surface of the drawing in FIG. 7 and reflecting a light beam (S-polarized light beam) oscillating in a direction vertical to the surface of the drawing in FIG. 7.

The plurality of the dichroic mirrors include a first dichroic mirror RDM for reflecting an S-polarized light beam of the red color and transmitting green and blue color light beams, a second dichroic mirror GDM for reflecting an S-polarized light beam of the green color and transmitting red and blue color light beams and a third dichroic mirror BDM for reflecting an S-polarized light beam of the blue color and transmitting red and green color light beams.

First, when the light beams outputted from the first lens group L1 impinge on the first dichroic mirror RDM, the S-polarized light beam of the red color is reflected thereby. When the green and blue color light beams passing through the first dichroic mirror RDM impinge on the second dichroic mirror GDM, the S-polarized light beam of the green color is reflected thereby. When the S-polarized light beam of the blue color passing through the second dichroic mirror GDM impinges on the third dichroic mirror BDM, the S-polarized light beam of the blue color is reflected thereby.

Relation among the reflection angles of R, G, B color light beams is represented by the formula (1).

S-polarized light beams reflected by the dichroic mirrors RDM, GDM, BDM impinge on a second lens group L2, so that optical axes of them become parallel to each other, and are focused on a single common plane F (image plane) by controlling the focal length of the second lens group L2.

On the image plane F, there are disposed a transmission type display element SLM equipped with a modulation member having a characteristic of polarization or birefringence. The modulation member has color display areas B, G, R which provide picture information corresponding to B, G, R colors. S-polarized RGB color light beams are respectively collected to the color display areas B, G, R corresponding to the colors, and outputted therefrom being modulated thereby.

After causing the outputted color light beams to pass through analyzers (not shown) to remove unnecessary components thereof, the outputted color light beams each carrying picture information are inputted to a second projection optical system of the present invention. This second projection optical system does not require the three color composition optical system.

In the second projection optical system of the present invention, on a diaphragm (not shown) of the projection lens PL, there are provided a hologram AP having a diameter approximately as large as that of the diaphragm. The hologram AP has a characteristic to alter or diffract effectively a light beam which has a specified wavelength and impinges on the surface of the hologram AP at a specified incident angle, in a direction vertical to a surface of hologram AP. In this case, the hologram AP has a characteristic that the blue color light beam BL and the red color light beam RL are effectively diffracted and the green color light beam GL is not diffracted. As an example of this kind of hologram AP, there is a volume hologram.

The hologram AP formed on a film or on a glass plate is applicable. Further, as the characteristic of the hologram AP is different for each color, it is possible to form the hologram AP by overlaying patching a plurality of holograms made for each color or by forming a plurality of holograms on a single by multiple exposures.

The blue color light beam BL impinging on the projection lens PL is inputted to the diaphragm by being refracted by the projection lens PL. As the hologram AP is provided on the diaphragm of the projection lens PL and the blue color light beam BL is preliminarily refracted by the projection lens PL so as to have an incident angle for allowing the most effective diffraction, the blue color light beam BL is effectively diffracted by the hologram AP in a direction of an optical axis of the optical system or in the direction vertical to the surface of the hologram AP.

The red color light beam RL impinging on the projection lens PL is inputted to the diaphragm by being refracted by the projection lens PL. As the hologram AP is provided on the diaphragm of the projection lens PL and the red color light beam RL is preliminarily refracted by the projection lens PL so as to have an incident angle for allowing the most effective diffraction, the red color light beam RL is also effectively diffracted by the hologram AP in the direction of the optical axis of the optical system or in the direction vertical to the surface of the hologram AP.

The green color light beam GL impinging on the projection lens PL is inputted to the diaphragm of the projection lens PL by being refracted by the projection lens PL. Though the hologram AP is provided on the diaphragm, the green color light beam GL is not diffracted by the hologram AP as mentioned in the foregoing. Thus, the green color light beam GL goes straight through the hologram AP.

The color light beams BL, GL, RL passing through the hologram present on the optical axis of the optical system as an image light WL, and are projected.

According to the second projection optical system shown in the sixth embodiment, it does not require a three color composition optical system residing outside the projection lens. Thus, it is possible not only to reduce the size of the optical system but also to reduce the production costs of the optical system and the display element SLM by increasing the available area of the display element SLM.

Further, it is possible to obtain an image having a higher contrast ratio by disposing an analyzer (not shown) between the second lens group L2 and the display element SLM because of a multiplicative effect of the analyzer and restriction of polarized light components, which the dichroic mirrors of the illumination optical system have.

In this image display apparatus shown in the sixth embodiment, the illumination optical system shown in FIG. 6 is employed, however, it is possible to employ the ones shown in FIGS. 3 to 5 because they are suitable for illuminating each of the image areas placed on single common plane irrespective of the material of the modulation member used in the display element.

[Seventh embodiment]

Next, the description is given of a seventh embodiment of the present invention as a third projection optical system.

Figure 9:
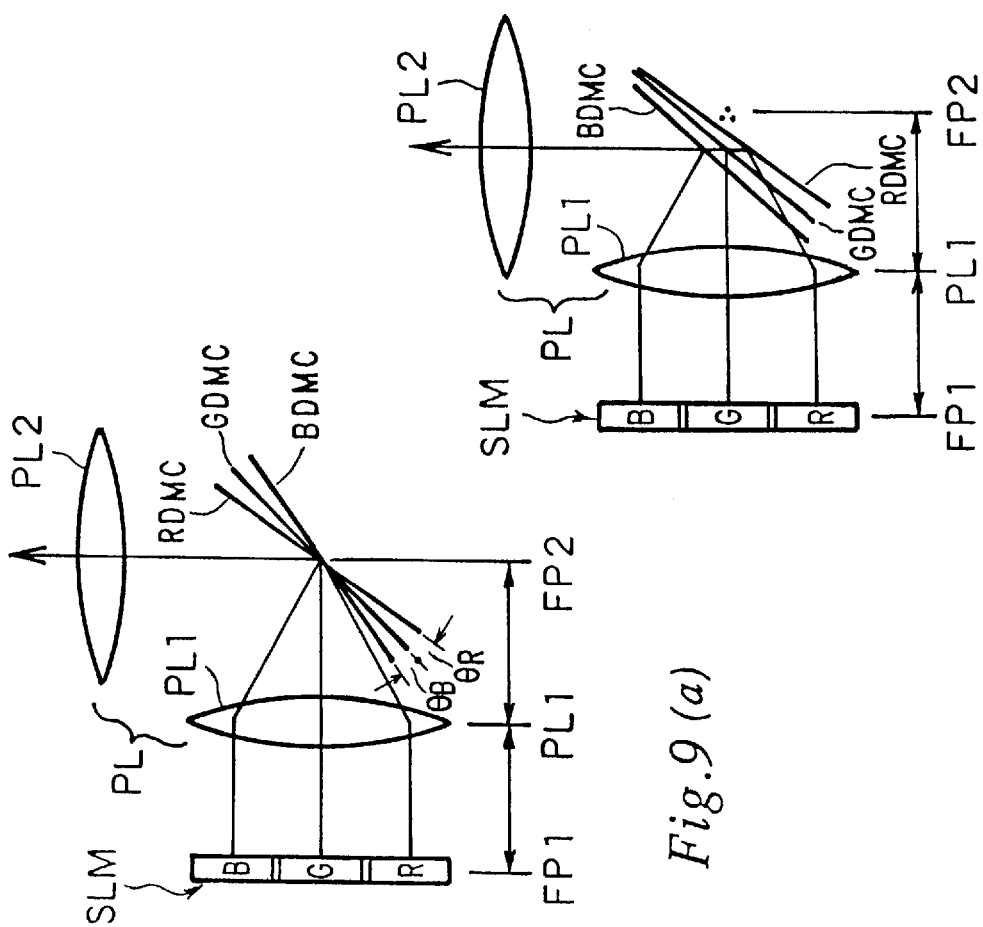
FIGS. 9(a) to 9(c) are schematic views showing a seventh embodiment of the present invention as a third projection optical system, and they show respectively the constructive examples of the dichroic mirrors RDMC, GDMC, BDMC, wherein the composite positions of the color light beams are respectively changed.

FIGS. 9(a) to 9(c) are schematic views showing a seventh embodiment of the present invention as a third projection optical system, and they show respectively the structural examples of the dichroic mirrors RDMC, GDMC, BDMC, wherein the composite positions of the 3 color light beams are respectively changed.

Thus, the explanation is given of only different points from the second projection system shown in the sixth embodiment and in FIG. 8.

The third projection optical system in the seventh embodiment employs a projection lens PL composed of a first projection lens PL1 and a second lens group PL2. The third projection optical system comprises the first lens group PL1, a display element SLM disposed on a single common plane at a frontal focal point FP1 of the first projection lens group PL1, a three color composition device made of three color dichroic mirrors RDMC, GDMC, BDMC disposed nearby a rear focal point FP2 of the first projection lens FP1, and the second projection lens group PL2 for projecting three color light beams reflected by the dichroic mirrors RDMC, GDMC, BDMC.

In FIGS. 9(a) to 9(c), the structural examples of the dichroic mirrors RDMC, GDMC, BDMC are shown respectively, wherein the composite positions of the color light beams are respectively changed.

Specifically, FIG. 9(a) shows a case where the three color light beams are composed into a single beam at the rear focal point FP2.

As seen in FIG. 9(a), all the dichroic mirrors RDMC, GDMC, BDMC intersect each other at the rear focal point FP2 of the first projection lens PL1.

FIG. 9(b) shows a case where the three color light beams are combined into a single beam short of the rear focal point FP2 of the first projection lens group PL1. In this case, it is possible to position the intersecting points of the dichroic mirrors RDMC, GDMC, BDMC out of the optical axis of the optical system FIG. 9(c) shows a case where the three color light beams are combined into a single beam at a point farther than the rear focal point FP2 of the first projection lens group PL1. In this case, it is possible to position the intersecting points of the dichroic mirrors RDMC, GDMC, BDMC out of the optical axis of the optical system.

The operations of the structural examples of the dichroic mirrors shown in FIGS. 9(a) to 9(c) are the same in principle. Thus, the explanation thereof is only given of the example shown in FIG. 9(a).

In FIG. 9(a), the display element SLM is disposed at the front focal point FP1 of the first projection lens group PL1. The display element SLM is composed of three color elements or three color display areas (R, G, B) corresponding to the three colors, which the three color display areas (R, G, B) are disposed at a single common plane. RGB color light beams outputted from the three color elements or the three color display areas (R, G, B) are combined together converted to parallel light beams with respect to principal rays thereof and they are focused at the rear focal point FP2 or a diaphragm point of the first lens group PL1. At the rear focal point FP2, there are provided the three color dichroic mirrors RDMC, GDMC, BDMC as the three color composition means.

In FIG. 9(a), the G color light beam of which the principal ray accords with an optical axis of the first lens group PL1, is reflected by the dichroic mirror GDMC which selectively reflects only the green light beam, and is outputted along an optical axis of the second projection lens group PL2.

On the other hand, the R and B color light beams of which the principal rays are different from the optical axis thereof, are focused on or bent to the rear focal point FP2 of the first lens group PL1. And they are respectively reflected by the dichroic mirrors RDMC, BDMC which selectively reflect the red color light beam and the blue light beam respectively, and are outputted in the same direction as that of the G color light beam.

In this case, it is possible to cause the principal rays of the R, G, B light beams to be combined to one beam by determining appropriate inclined angles θB, θR of the dichroic mirrors BDMC, RDMC to the dichroic mirror GDMC, resulting an image light to be displayed.

In the embodiments shown in FIGS. 9(a) to 9(c), the optical axis of the second lens group PL2 is perpendicular to that of the first lens group PL1. However, it is possible to optionally select an outputted angle of the image light by selecting inclined angles of the dichroic mirrors RDMC, GDMC, BDMC respectively.

According to the third projection optical system of the seventh embodiment in the present invention, there are provided three color composition means composed of the three color dichroic mirrors placed nearby the diaphragm point of the projection lens group. Thus, it is possible to construct an image display apparatus having a high vignetting factor because of no provision of three color composition prisms, resulting in an image display apparatus capable of displaying a bright image.

In the third projection optical system of the present invention, any illumination optical systems shown in FIGS. 1 to 4 can be used.

[Eighth embodiment]

Next, the description is given of an eighth embodiment of the present invention as an image display apparatus employing the illumination optical system shown in FIG. 3 and a fourth projection optical system.

Figure 10:
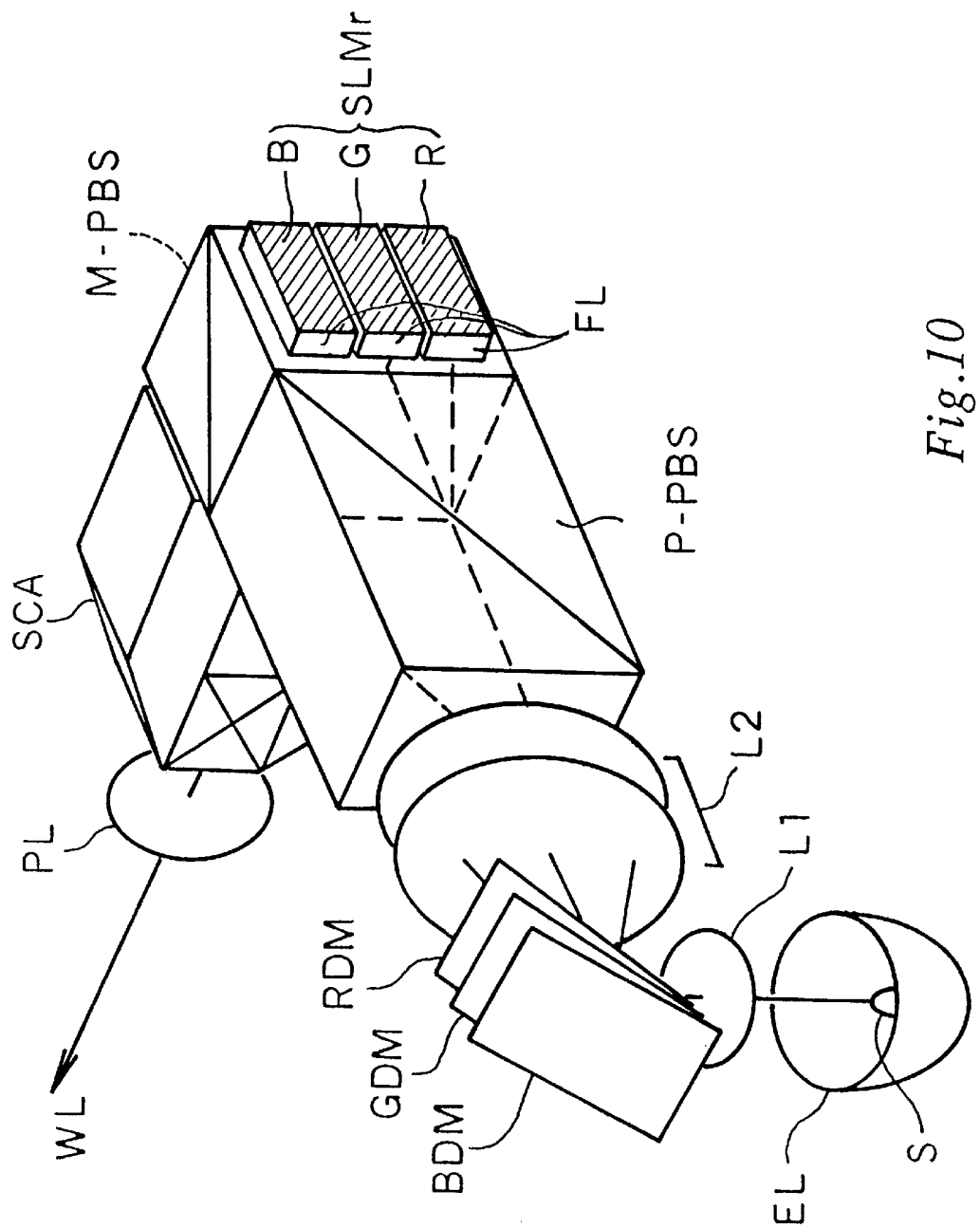
FIG. 10 is a perspective view showing an eighth embodiment of the present invention as an image display apparatus.

FIG. 10 is a perspective view showing an eighth embodiment of the present invention as an image display apparatus.

Referring to FIG. 10, light beams generated from a light source S are collected by an elliptical mirror EL. A first lens group L1 is disposed so that a spot of lights converged by the elliptical mirror EL is positioned within a focal length (not shown) of the first lens group 1. Thereby, the first lens group L1 has a function of a bright lens group by suppressing the diffusion of the light beams.

The light beams outputted from the first lens group L1 impinge on a plurality of dichroic mirrors enclosed in a transparent liquid LQD (not shown) having approximately the same refractive index as that of the optical glass in such manner that reflection angles of the plurality of the dichroic mirrors are different from each other.

The plurality of the dichroic mirrors include a first dichroic mirror RDM having a character of reflecting the R color light beam and transmitting G and B color light beams, a second dichroic mirror GDM a character of reflecting the G color and transmitting R and B color light beams and a third dichroic mirror BDM having a character of reflecting the B color and transmitting R and G color light beams.

First, when the light beam outputted from the first lens group L1 impinges on the first dichroic mirror RDM, the R color light beam is reflected thereby. When the G and B color light beams passing through the first dichroic mirror RDM impinge on the second dichroic mirror GDM, the G color light beam is reflected thereby. When the B color light beam passing through the second dichroic mirror GDM impinges on the third dichroic mirror BDM, the G color light beam is reflected thereby.

Relation among the reflection angles of R, G, B color light beams is represented by the formula (1).

The color light beams reflected by the dichroic mirrors RDM, GDM, BDM impinge on a second lens group L2, so that optical axes of them become parallel to each other. After that they are inputted to a pre-polarizer P-PBS for transmitting only predetermined polarized components of the color light beams. Then, they are inputted to a polarizing beam splitter M-PBS. The polarized light beams (S-polarized light beams) allowed to pass through the pre-polarizer P-PBS are reflected by a boundary surface of the polarizing beam splitter M-PBS, and are inputted to convex lenses FL disposed in the paths of color light beams and between a reflection type display element SLMr and the polarizing beam splitter M-PBS, and reach to color display areas R, G, B of a modulation member of a reflection type display element SLMr. The color display areas R, G, B give picture information for every color to the inputted color light beams. The reflected color light beams containing the picture information from the reflection type display element SLMr pass through the convex lenses FL and impinge on the polarization beam splitter M-PBS. Thereby, only the P-polarized components thereof pass through the polarization beam splitter M-PBS, and are inputted to the three color composition optical system SCA. Image light beam WL formed by the three color composition optical system SCA is magnified and projected by a projection lens PL.

According to the image display apparatus shown in the eighth embodiment of the present invention, the divergence of the color light beams are restricted by the convex lenses FL. Thus, it is possible to reduce the size of the apertures of the three color composition optical system SCA as well as the image display apparatus of the fifth embodiment shown in FIG. 7.

Further, it is possible to further reduce the overall size of the optical system because the forth projection optical system employs the reflection type display element SLMr.

Further, it is possible to render the focal lengths of the convex lenses FL twice as large as those of the convex lenses FL used together with the transmission type display element because the color light beams go and return therethrough. This contributes to reduce the production cost of the projection lens because this easily allows aberration compensation such as a distortion.

Further, in this image display apparatus, the three color separation optical system and the three color composition optical system are separately provided. This enables a high contrast display irrespective of the material of the three color composition optical system.

As mentioned in the foregoing, according to the illumination optical systems of the present invention, it is possible to reduce the optical path compared with that of the prior art, so that they can effectively and uniformly illuminate the image areas disposed on a single and common plane of the display element. Further, it is possible to provide an illumination optical system suitable for the display element utilizing the polarized light beams.

Further, according to the projection optical systems of the present invention, it is possible to reduce the size of the three color composition optical system or possible to construct it with only one projection lens group. This contributes to reductions of the size and the production cost of the optical system.

Further, according to the image display apparatuses employing the illumination optical systems and the projection optical systems, it is possible to reduce of the overall size of the apparatus and to display images having high contrast and a high quality.

What is claimed is:

1. An illumination optical system comprising:
   an ellipse mirror having a light collecting area for collecting light beams generated from a light source;
   a first lens group having a converging characteristic for suppressing a divergence of the light beams reflected from the light collecting area of the ellipse mirror;
   color filtering means for separating the light beams into three color light beams and altering paths of the three color light beams being separated; and
   a second lens group having a converging characteristic for illuminating objects disposed on a single common plane by focusing the three color light beams separated thereon, and wherein a focal point of the second lens group is determined so that optical axes of the three color light beams from the color filtering means are made parallel to each other.

2. An illumination optical system as claimed in claim 1, wherein the color filtering means is composed of a plurality of color filters of first, second and third color filters, and the second color filter is positioned to be interposed between the first and third color filters and has a reflection angle of 45° with respect to an optical axis of the first lens group, and the first, second, and third color filters have different reflection angles from each other.

3. An illumination optical system as claimed in claim 1, wherein the color filtering means is composed of three color filters, which are a red color filter for reflecting a-red light beam, a blue color filter for reflecting a blue color light beam and a green color filter for reflecting a green color light beam included in the light beams generated from the light source.

4. An illumination optical system comprising:
   a parabolic mirror for reflecting and changing light beams generated from a light source into substantially parallel beams;
   color filtering means for separating the light beams from the parabolic mirror into three color light beams and altering optical paths of the three color light beams being separated; and
   a lens group having a converging characteristic for illuminating objects disposed on a single common plane by focusing the three color light beams being separated thereon, and wherein a focal point of the lens group is determined so that optical axes of the three color light beams from the color filtering means are made parallel to each other.

5. An illumination optical system as claimed in claim 4, wherein the color filtering means is composed of a plurality of color filters of first, second and third color filters, and the second color filter is positioned to be interposed between the first and third color filters and has a reflection angle of 45° with respect to an optical axis of the first lens group, and the first, second and third color filters have different reflection angles from each other.

6. An illumination optical system as claimed in claim 4, wherein the color filtering means is composed of three color filters, which are a red color filter for reflecting a red light beam, a blue color filter for reflecting a blue color light beam and a green color filter for reflecting a green color light beam included in the light beams generated from the light source.

7. An illumination optical system comprising:
   a parabolic mirror for reflecting and changing light beams generated from a light source into substantially parallel beams;
   color filtering means for separating the light beams from the parabolic mirror into three color light beams and altering optical paths of the three color light beams being separated; and
   a lens group having a converging characteristic for illuminating objects disposed on a single common plane by focusing the three color light beams being separated thereon, and
   wherein the color filtering means is enclosed in a liquid having a refractive index substantially as large as that of an optical glass used in the illumination optical system.

8. An illumination optical system comprising:
   an ellipse mirror having a light collecting area for collecting light beams generated from a light source;
   a first lens group having a converging characteristic for suppressing a divergence of the light beams reflected from the light collecting area of the ellipse mirror;
   color filtering means for separating the light beams into three color light beams and altering paths of the three color light beams being separated; and
   a second lens group having a converging characteristic for illuminating objects disposed on a single common plane by focusing the three color light beams separated thereon, and wherein the color filtering means has a characteristic of reflecting mainly a polarized component of a light beam oscillating in a vertical direction to a plane of incidence of the light beam.

9. An illumination optical system comprising:
   an ellipse mirror having a light collecting area for collecting light beams generated from a light source;
   a first lens group having a converging characteristic for suppressing a divergence of the light beams reflected from the light collecting area of the ellipse mirror;
   color filtering means for separating the light beams into three color light beams and altering paths of the three color light beams being separated; and
   a second lens group having a converging characteristic for illuminating objects disposed on a single common plane by focusing the three color light beams separated thereon wherein the color filtering means is enclosed in a liquid having a refractive index substantially as large as that of an optical glass used in the illumination optical system.

10. An illumination optical system comprising:
    a parabolic mirror for reflecting and changing light beams generated from a light source into substantially parallel beams;
    color filtering means for separating the light beams from the parabolic mirror into three color light beams and altering optical paths of the three color light beams being separated; and
    a lens group having a converging characteristic for illuminating objects disposed on a single common plane by focusing the three color light beams being separated thereon, and wherein the color filtering means has a characteristic of reflecting mainly a polarized component of a light beam oscillating in a vertical direction to a plane of incidence of the light beam.

11. A projection optical system comprising:

a color composition means for forming a single image light beam for projection from a plurality of color images disposed on a substantially single and common plane at a predetermined distance therebetween;

a projection lens for projecting the image light beam; and a plurality of convex lenses disposed between the plurality of color images and the color composition means for inputting the plurality of color images disposed on the a substantially single and common plane to the color composition means so that the predetermined distance is made smaller when the plurality of color images are inputted to the color composition means to form the single image light beam.

12. A projection optical system comprising:

a projection lens group having a diaphragm, for projecting an image light beam composed of a plurality of color light beams; and a color composition means for forming the image light beam composed of the plurality of color light beams generated from a plurality of color images disposed on an approximately single and common plane at a predetermined distance, wherein the color composition means is provided nearby the diaphragm of the projection lens in such a manner that different principal ray of the plurality of color light beams accord with an identical principal ray so as to form the image light beam.

13. A projection optical system as claimed in claim 12, wherein the color composition means is composed of a hologram having a function that a first color light beam in accordance with an optical axis of the image light beam for projection goes straight, and directions of second color light beams other than the first color light beam in accordance with the optical axis thereof are altered to accord with the optical axis of the image light beam.

14. A projection optical system as claimed in claim 12, wherein the color composition means is composed of a plurality of color filters for reflecting respectively the color light beams depending on a predetermined wavelength range of the color light beams and transmitting light beams having wavelength range other than the predetermined wavelength range, and the plurality of color filters are inclined to each other so as to form and output the image light beam by causing the color light beams reflected thereby.

15. An image display apparatus having an illumination optical system for illuminating in various colors a plurality of color images and a projection optical system for projecting an image light beam composed of the plurality of color light beams, wherein the illumination optical system comprises:

an ellipse mirror having a light collecting area for collecting light beams generated from a light source;

a first lens group having a converging characteristic for suppressing a divergence of the light beams reflected from the light collecting area of the ellipse mirror;

color filtering means for separating the light beams into three color light beams and altering paths of the three color light beams being separated; and a second lens group having a converging characteristic for illuminating objects disposed on a single common plane by focusing the three color light beams separated thereon and wherein a focal point of the second lens group is determined so that the optical axes of the three color light beams from the color filtering means are made parallel to each other.

16. An image display apparatus as claimed in claim 15 wherein the projection optical system comprises:

a color composition means for forming a single image light beam for projections from a plurality of color images disposed on substantially single and common plane at a predetermined distance therebetween;

a projection lens for projecting the image light beam; and a plurality of convex lenses disposed between the plurality of color images and the color composition means for inputting the plurality color images disposed on the substantially single and common plane to the color composition means so that the predetermined distance is made smaller when the plurality of color images are inputted to the color composition means to form the single image light beam.

17. An image display apparatus as claimed in claim 15 wherein the projection optical system employs comprises:

a projection lens group having a diaphragm, for projecting an image light beam composed of a plurality of color light beams; and a color composition means for forming the image light beam composed of the plurality of color light beams generated from a plurality of color images disposed on a substantially single and common plane at a predetermined distance, wherein the color composition means is provided nearby the diaphragm of the projection lens in such a manner that different principal ray of the plurality of color light beams accord with an identical principal ray so as to form the image light beam.

18. An image display apparatus having an illumination optical system for illuminating in various colors a plurality of color images at every color and a projection optical system for projecting an image light composed of the plurality of color light beams, wherein the illumination optical system comprises:

a parabolic mirror for reflecting and changing light beams generated from a light source into substantially parallel beams;

color filtering means for separating the light beams from the parabolic mirror into three color light beams and altering optical paths of the three color light beams being separated; and a lens group having a converging characteristic for illuminating objects disposed on a single common plane by focusing the three color light beams being separated thereon, and wherein a focal point of the lens group is determined so that optical axes of the three color light beams from the color filtering means are made parallel to each other.

19. An image display apparatus as claimed in claim 18 wherein the projection optical system comprises:

a color composition means for forming a single image light beam for projection from a plurality of color images disposed on an substantially single and common plane at a predetermined distance therebetween;

a projection lens for projecting the image light beam; and a plurality of convex lenses disposed between the plurality of color images and the color composition means for inputting the plurality of color images disposed on the substantially single and common plane to the color composition means so that the predetermined distance is made smaller when the plurality of color images are inputted to the color composition means to form the single image light beam.

20. An image display apparatus as claimed in claim 18 wherein the projection optical system comprises:

a projection lens group having a diaphragm, for projecting an image light beam composed of a plurality of color light beams; and a color composition means for forming the image light beam composed of the plurality of color light beams generated from a plurality of color images disposed on a substantially single and common plane at a predetermined distance, wherein the color composition means is provided nearby the diaphragm of the projection lens in such a manner that different principal ray of the plurality of color light beams accord with an identical principal ray so as to form the image light beam.

* * * * *